US010539829B1

United States Patent
Lu et al.

(10) Patent No.: US 10,539,829 B1
(45) Date of Patent: Jan. 21, 2020

(54) METHOD OF SELECTING A STATE OF A SWITCHABLE HALF WAVEPLATE AND SELECTING AN OPTICAL POWER OF A LIQUID LENS STRUCTURE IN OPTICAL SERIES WITH A LIQUID CRYSTAL LENS IN A HEAD-MOUNTED DISPLAY

(71) Applicant: Facebook Technologies, LLC, Menlo Park, CA (US)

(72) Inventors: Lu Lu, Kirkland, WA (US); Scott Charles McEldowney, Redmond, WA (US); Pasi Saarikko, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/445,564

(22) Filed: Jun. 19, 2019

Related U.S. Application Data

(63) Continuation of application No. 16/163,306, filed on Oct. 17, 2018, now Pat. No. 10,371,872, which is a
(Continued)

(51) Int. Cl.
*G02F 1/13363* (2006.01)
*G02B 3/14* (2006.01)
(Continued)

(52) U.S. Cl.
CPC .......... *G02F 1/13363* (2013.01); *G02B 3/14* (2013.01); *G02B 26/004* (2013.01); *G02F 1/29* (2013.01);
(Continued)

(58) Field of Classification Search
CPC .................. G02F 1/29; G02F 2413/05; G02F 2001/133541; G02F 2413/01; G02F 2001/133638; G02B 3/14; G02B 26/004
See application file for complete search history.

(56) References Cited

U.S. PATENT DOCUMENTS 6,115,152 A    9/2000   Popovich et al.
9,429,756 B1    8/2016   Cakmakci et al.
(Continued)

FOREIGN PATENT DOCUMENTS

WO    WO 2014/181419 A1    11/2014
WO    WO-2014181419 A1 *   11/2014

OTHER PUBLICATIONS

Banks, M.S. et al., "Consequences of Incorrect Focus Cues in Stereo Displays," SIDS Information Display Online, Jul. 2008, 7 pages, [Online] [Retrieved on Jun. 26, 2017] Retrieved from the Internet<URL:http://informationdisplay.org/IDArchive/2008/July/ConsequencesofIncorrectFocusCuesinStereoDis.aspx>.
(Continued)

*Primary Examiner* — Paul C Lee
(74) *Attorney, Agent, or Firm* — Fenwick & West LLP

(57) ABSTRACT

A varifocal block includes liquid crystal (LC) lens and a liquid lens structure in optical series. The LC lens has a plurality of optical states, including an additive state that adds optical power to the LC lens and a subtractive state that removes optical power from the LC lens. The liquid lens structure comprises a transparent substrate layer, a deformable membrane, and a volume of liquid enclosed between the transparent substrate layer and the deformable membrane. The deformable membrane has an adjustable range of optical power dependent on an adjustable curvature of the deformable membrane. The plurality of optical states of the LC lens and the adjustable range of optical power of the liquid lens structure together provide a continuous range of optical power for the varifocal block.

20 Claims, 9 Drawing Sheets

Related U.S. Application Data continuation of application No. 15/693,839, filed on Sep. 1, 2017, now Pat. No. 10,248,001.

(60) Provisional application No. 62/423,091, filed on Nov. 16, 2016.

(51) Int. Cl.
*G02F 1/29* (2006.01)
*G02B 26/00* (2006.01)
*G02F 1/1335* (2006.01)

(52) U.S. Cl.
CPC .......... *G02F 2001/133541* (2013.01); *G02F 2001/133638* (2013.01); *G02F 2413/01* (2013.01); *G02F 2413/05* (2013.01)

(56) References Cited

U.S. PATENT DOCUMENTS

| | | | |
|---|---|---|---|
| 10,151,961 B2 | 12/2018 | Lu et al. | |
| 2002/0176148 A1* | 11/2002 | Onuki | G02B 3/14 |
| | | | 359/253 |
| 2005/0047705 A1 | 3/2005 | Domash et al. | |
| 2005/0254752 A1 | 11/2005 | Domash et al. | |
| 2009/0316097 A1* | 12/2009 | Presniakov | G02F 1/29 |
| | | | 349/129 |
| 2010/0231783 A1* | 9/2010 | Bueler | G02B 3/14 |
| | | | 348/347 |
| 2012/0019523 A1* | 1/2012 | Lee | G02B 26/004 |
| | | | 345/419 |
| 2012/0154924 A1* | 6/2012 | Lee | G02B 7/028 |
| | | | 359/666 |
| 2013/0176203 A1 | 7/2013 | Yun et al. | |
| 2014/0022619 A1 | 1/2014 | Woodgate et al. | |
| 2014/0204455 A1 | 7/2014 | Popovich et al. | |
| 2015/0010265 A1 | 1/2015 | Popovich et al. | |
| 2016/0103253 A1 | 4/2016 | Oku et al. | |
| 2016/0349506 A1* | 12/2016 | Meneghini | G02B 3/14 |
| 2017/0293145 A1 | 10/2017 | Miller et al. | |
| 2018/0132698 A1 | 5/2018 | Galstian et al. | |

OTHER PUBLICATIONS

Crawford, G.P., "Electrically Switchable Bragg Gratings," Optics & Photonics News, Apr. 2003, pp. 54-59, vol. 14, No. 4.

Hoffman, D.M. et al., "Vergence—Accomodation Conflicts Hinder Visual Performance and Cause Visual Fatigue," Journal of Vision, Mar. 2008, pp. 1-30, vol. 8, No. 33.

Nowinowski-Kruszelnicki, E. et al., "High Birefringence Liquid Crystal Mixtures for Electro-Optical Devices," Optica Applicata XLII, No. 1, 2012, pp. 167-180.

Shibata, T. et al., "The Zone of Comfort: Predicting Visual Discomfort with Stereo Displays," Journal of Vision, Jul. 2011, pp. 1-29, vol. 11(8), No. 11.

United States Office Action, U.S. Appl. No. 15/693,839, dated Apr. 19, 2018, 9 pages.

* cited by examiner (Real World)

(3D Display)

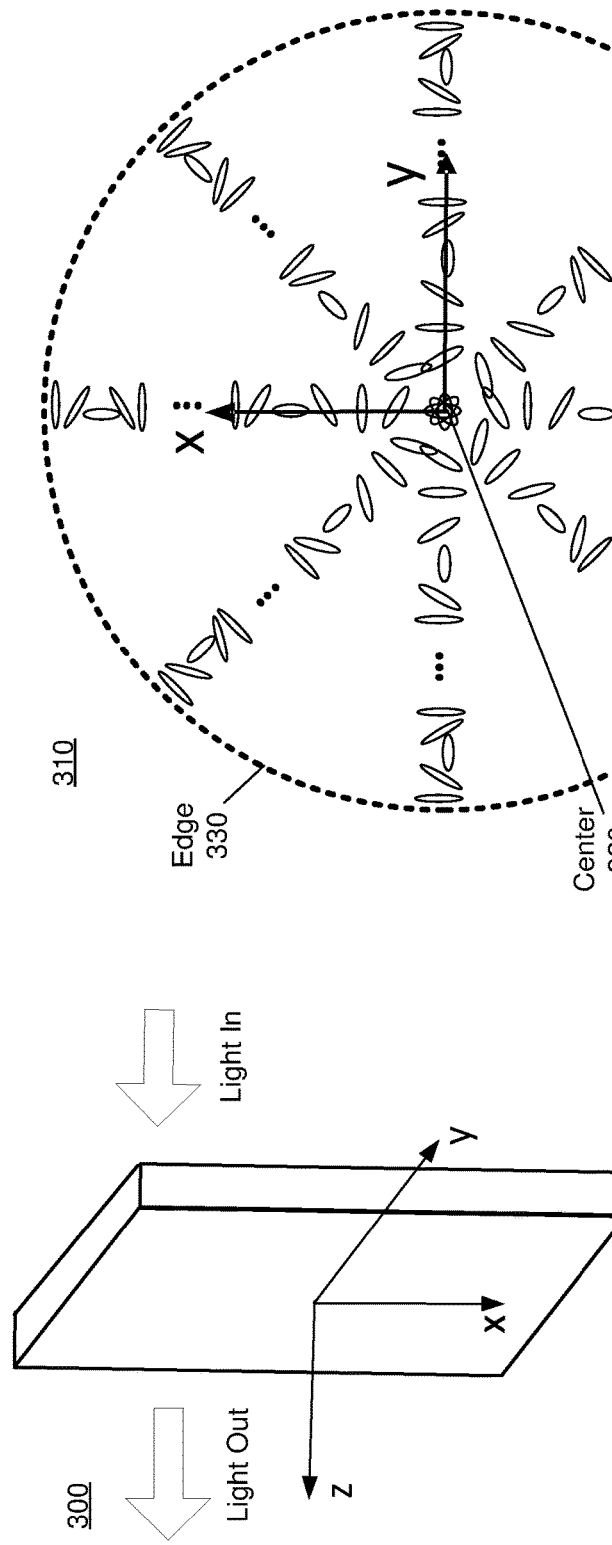
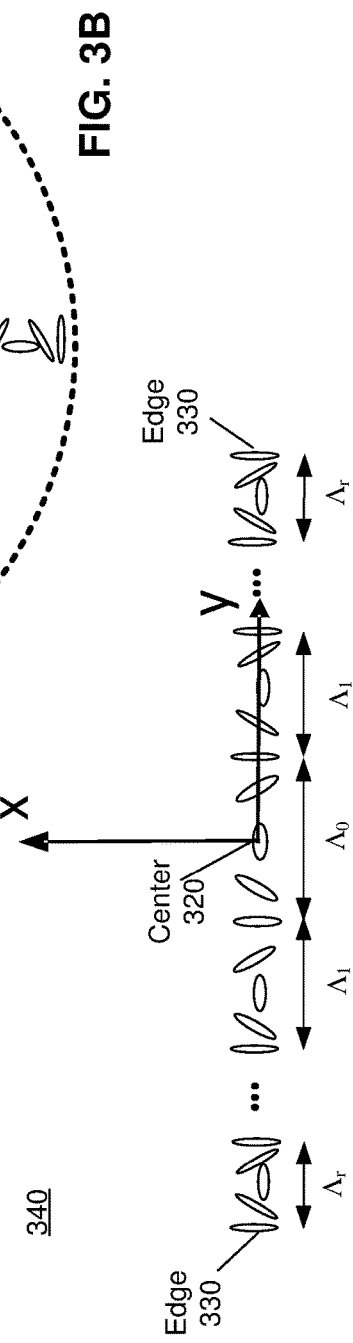
FIG. 3A
FIG. 3B
FIG. 3C

METHOD OF SELECTING A STATE OF A SWITCHABLE HALF WAVEPLATE AND SELECTING AN OPTICAL POWER OF A LIQUID LENS STRUCTURE IN OPTICAL SERIES WITH A LIQUID CRYSTAL LENS IN A HEAD-MOUNTED DISPLAY

CROSS REFERENCE TO RELATED APPLICATIONS

This application is a continuation of co-pending U.S. application Ser. No. 16/163,306, filed Oct. 17, 2018, which is a continuation of U.S. application Ser. No. 15/693,839, filed Sep. 1, 2017, now U.S. Pat. No. 10,248,001, which claims the benefit of U.S. Provisional Application No. 62/423,091, filed Nov. 16, 2016, each of which are incorporated by reference in their entirety.

BACKGROUND

The present disclosure generally relates to enhancing images from electronic displays, and specifically to varying a focal length of optics with a compact design to enhance comfortable viewing experience in head mounted displays.

Virtual reality (VR) headset can be used to simulate virtual environments. For example, stereoscopic images can be displayed on an electronic display inside the headset to simulate the illusion of depth and head tracking sensors can be used to estimate what portion of the virtual environment is being viewed by the user. Such a simulation, however, can cause visual fatigue and nausea resulting from an inability of existing headsets to correctly render or otherwise compensate for vergence and accommodation conflicts. Augmented Reality (AR) headsets display a virtual image overlapping with the real world. To create comfortable viewing experience, the virtual image generated by the AR headsets needs to be displayed at the right distance for the eye accommodations of the real world objects at different time.

SUMMARY

A varifocal block has a continuous range of adjustment of optical power. The varifocal block includes a liquid crystal (LC) lens and a liquid lens structure. The LC lens has a plurality of optical states that include an additive state that adds optical power to the LC lens and a subtractive state that removes optical power from the LC lens. The liquid lens structure is in optical series with the LC lens. The liquid lens structure includes a transparent substrate layer and a deformable membrane. The deformable membrane has an adjustable range of optical power that is based in part on adjusting a curvature of the deformable membrane. Enclosed between the transparent substrate layer and the deformable membrane is a liquid (in some embodiments may be a constant volume). The plurality of optical states of the LC lens and the adjustable range of optical power of the liquid lens structure together provide a continuous range of adjustment of optical power for the varifocal block.

The varifocal block may be part of a head-mounted display (HMD). The HMD presents content via an electronic display to a wearing user at a focal distance. The varifocal block presents the content over a plurality of image planes that are associated with different optical powers of the varifocal block. As noted above, the varifocal block has a continuous range of adjustment of optical power. Each value of optical power over the continuous range of adjustment of optical power corresponds to a different image plane of the plurality of image planes. In some embodiments, the varifocal block adjusts the image plane location in accordance with instructions from the HMD to, e.g., mitigate vergence accommodation conflict of eyes of the wearing user. The image plane location is adjusted by adjusting an optical power associated with the varifocal block, and specifically by adjusting the optical powers associated with one or both of the liquid lens structure and the LC lens.

BRIEF DESCRIPTION OF THE DRAWINGS

FIG. 3A is an example Pancharatnam Berry Phase liquid crystal lens, according to an embodiment.

FIG. 3B is an example of liquid crystal orientations in the Pancharatnam Berry Phase liquid crystal lens of FIG. 3A, according to an embodiment.

FIG. 3C is a portion of liquid crystal orientations in the Pancharatnam Berry Phase liquid crystal lens of FIG. 3A, according to an embodiment.

Figure 1A:
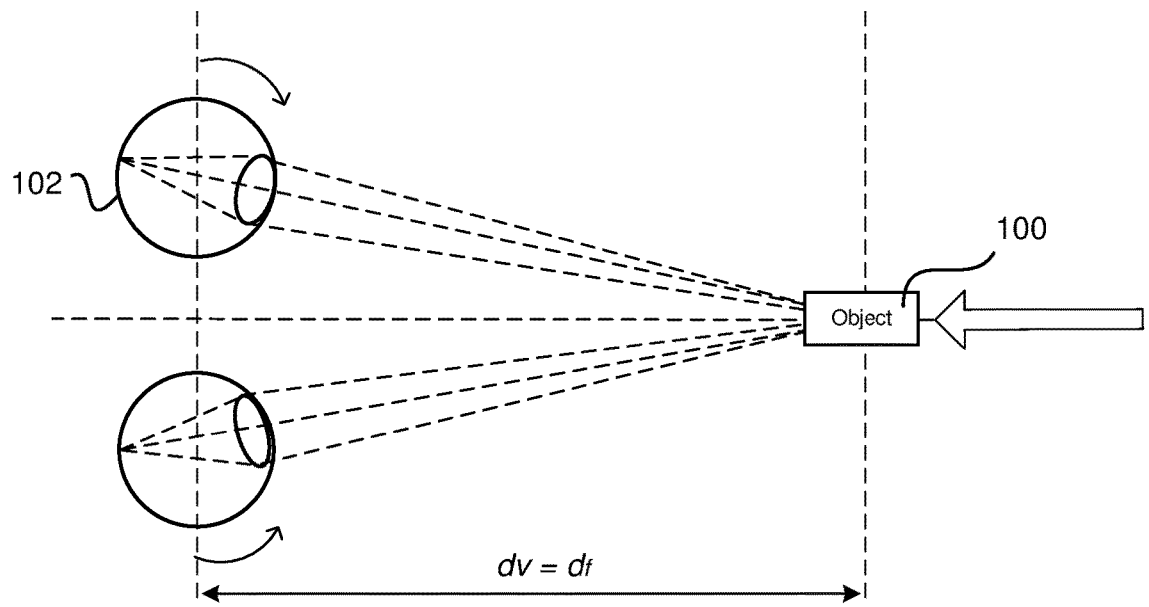
FIG. 1A shows the relationship between vergence and eye focal length in the real world.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

A varifocal system includes a head-mounted display (HMD). The HMD includes a varifocal block. The HMD presents content via an electronic display to a wearing user at a focal distance. The varifocal block adjusts the focal distance in accordance with instructions from the HMD to, e.g., mitigate vergence accommodation conflict of eyes of the wearing user. The focal distance is adjusted by adjusting an optical power associated with the varifocal block, and specifically by adjusting the optical powers associated with one or more varifocal structures within the varifocal block.

A varifocal structure is an optical device that is configured to dynamically adjust its focus in accordance with instructions from the varifocal system. A varifocal structure includes at least a Pancharatnam Berry Phase (PBP) liquid crystal lens and a liquid lens structure in optical series. Optical series refers to relative positioning of a plurality of optical elements such that light, for each optical element of the plurality of optical elements, is transmitted by that optical element before being transmitted by another optical element of the plurality of optical elements. Moreover, ordering of the optical elements does not matter. For example, optical element A placed before optical element B, or optical element B placed before optical element A, are both in optical series. Similar to electric circuitry design, optical series represents optical elements with their optical properties compounded when placed in series.

A PBP liquid crystal lens may be active or passive. An active PBP liquid crystal lens is an optical element that has three discrete focal states (also referred to as optical states). The three optical states are an additive state, a neutral state, and a subtractive state. The additive state adds optical power to the system (i.e., has a positive focus of 'f'), the neutral state does not affect the optical power of the system (and does not affect the polarization of light passing through the PBP liquid crystal lens), and the subtractive state subtracts optical power from the system (i.e., has a negative focus of '−f'). The state of an active PBP liquid crystal lens is determined by the by the handedness of polarization of light incident on the active PBP liquid crystal lens and an applied voltage. An active PBP liquid crystal lens operates in a subtractive state responsive to incident light with a right handed circular polarization and an applied voltage of zero (or more generally below some minimal value), operates in an additive state responsive to incident light with a left handed circular polarization and the applied voltage of zero (or more generally below some minimal value), and operates in a neutral state (regardless of polarization) responsive to an applied voltage larger than a threshold voltage which aligns liquid crystal with positive dielectric anisotropy along with the electric field. Note that if the active PBP liquid crystal lens is in the additive or subtractive state, light output from the active PBP liquid crystal lens has a handedness opposite that of the light input into the active PBP liquid crystal lens. In contrast, if the active PBP liquid crystal lens is in the neutral state, light output from the active PBP liquid crystal lens has the same handedness as the light input into the active PBP liquid crystal lens.

In contrast, a passive PBP liquid crystal lens has two optical states, specifically, an additive state and a subtractive state. And the state of a passive PBP liquid crystal lens is determined by the handedness of polarization of light incident on the passive PBP liquid crystal lens. A passive PBP liquid crystal lens operates in a subtractive state responsive to incident light with a right handed polarization and operates in an additive state responsive to incident light with a left handed polarization. Note that the passive PBP liquid crystal lens outputs light that has a handedness opposite that of the light input into the passive PBP liquid crystal lens.

The liquid lens structure is an optical element that is able to adjust focus (i.e., optical power) over a continuous range from a positive value to a negative value. There are fixed volume fluid filled lenses, and variable volume fluid-filled lenses. For HMD applications, a liquid lens can be preferable for many reasons. For example, a liquid lens offers a compact design, a large clear aperture size and a stable optical performance within the variable focus range (e.g. no air bubble, freedom on the frame/lens shape). In this application, we specifically use the liquid membrane lens which has a continuous range of 0 to F (in terms of optical power this may be represented as 0 to D. Note that an active PBP liquid crystal lens can adjust focus by −f, 0, or f, or in terms of optical power −d, 0, or d (here d is a positive number). Accordingly, in some embodiments, the varifocal structure that includes an active PBP liquid crystal lens is able to dynamically impart a continuous tunability of optical power ranging from −d to (d+D). In alternate embodiments, a varifocal structure may include a passive PBP liquid crystal lens that has a continuous tunability of optical power ranging from −d to (D−d); or d to (d+D).

In some embodiments, a virtual object is presented on the electronic display of the HMD that is part of the varifocal system. The light emitted by the HMD is configured to have a particular focal distance, such that the virtual scene appears to a user at a particular focal plane. As the content to be rendered moves closer/farther from the user, the HMD correspondingly instructs the varifocal block to adjust the focal distance to mitigate a possibility of a user experiencing a conflict with eye vergence and eye accommodation. Additionally, in some embodiments, the HMD may track a user's eyes such that the varifocal system is able to approximate gaze lines and determine a gaze point including a vergence depth (an estimated point of intersection of the gaze lines) to determine an appropriate amount of accommodation to provide the user. The gaze point identifies an object or plane of focus for a particular frame of the virtual scene and the HMD adjusts the distance of the varifocal block to keep the user's eyes in a zone of comfort as vergence and accommodation change.

Vergence-Accommodation Overview

Vergence-accommodation conflict is a problem in many virtual reality systems. Vergence is the simultaneous movement or rotation of both eyes in opposite directions to obtain or maintain single binocular vision and is connected to accommodation of the eye. Under normal conditions, when human eyes look at a new object at a distance different from an object they had been looking at, the eyes automatically change focus (by changing their shape) to provide accommodation at the new distance or vergence depth of the new object. FIG. 1A shows an example of how the human eye experiences vergence and accommodation in the real world. In the example of FIG. 1A, the user is looking at a real object 100 (i.e., the user's eyes are verged on the real object 100 and gaze lines from the user's eyes intersect at real object 100.). As the real object 100 is moved closer to the user, as indicated by the arrow in FIG. 1A, each eye 102 rotates inward (i.e., convergence) to stay verged on the real object 100A. As the real object 100 gets closer, the eye 102 must "accommodate" for the closer distance by changing its shape to reduce the power or focal length. Thus, under normal conditions in the real world, the vergence depth ($d_v$) equals the focal length ($d_f$).

Figure 1B:
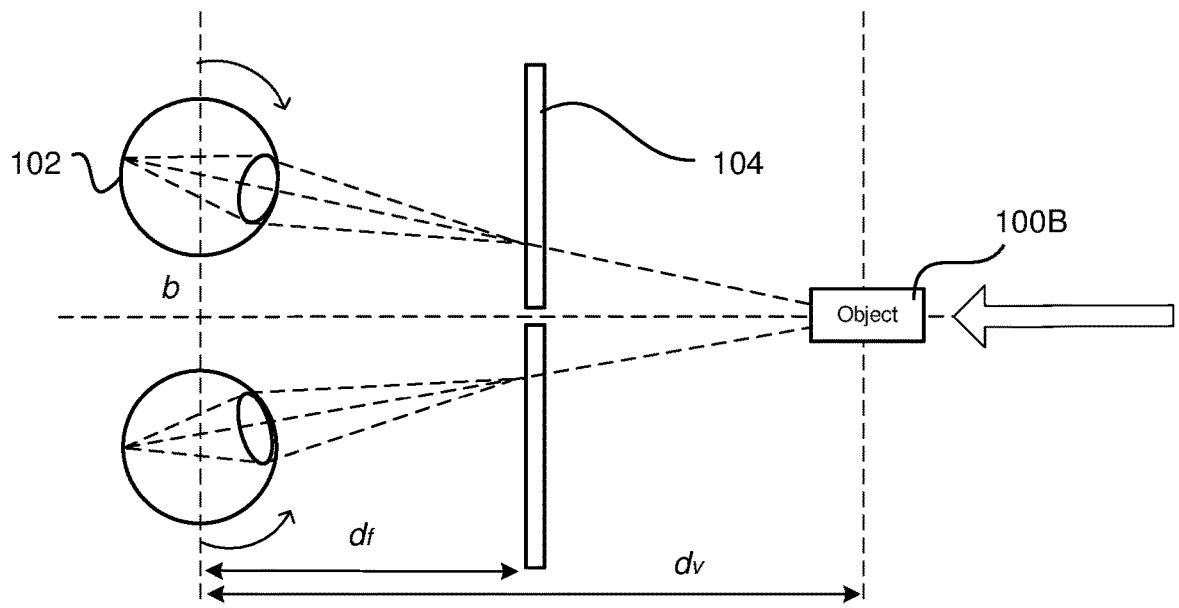
FIG. 1B shows the conflict between vergence and eye focal length in a three-dimensional display screen.

FIG. 1B shows an example conflict between vergence and accommodation that can occur with some three-dimensional displays. In this example, a user is looking at a virtual object 100B displayed on an electronic screen 104; however, the user's eyes are verged on and gaze lines from the user's eyes intersect at virtual object 100B, which is a greater distance from the user's eyes than the electronic screen 104. As the virtual object 100B is rendered on the electronic display 104 to appear closer to the user, each eye 102 again rotates inward to stay verged on the virtual object 100B, but the power or focal length of each eye is not reduced; hence, the user's eyes do not accommodate as in FIG. 1A. Thus, instead of reducing power or focal length to accommodate for the closer vergence depth, each eye 102 maintains accommodation at a distance associated with the electronic display 104. Thus, the vergence depth ($d_v$) often does not equal the focal length ($d_f$) for the human eye for objects displayed on 3D electronic displays. This discrepancy between vergence depth and focal length is referred to as "vergence-accommodation conflict." A user experiencing only vergence or accommodation and not both will eventually experience some degree of fatigue and nausea, which is undesirable for virtual reality system creators.

Head-Mounted Display Overview

Figure 2A:
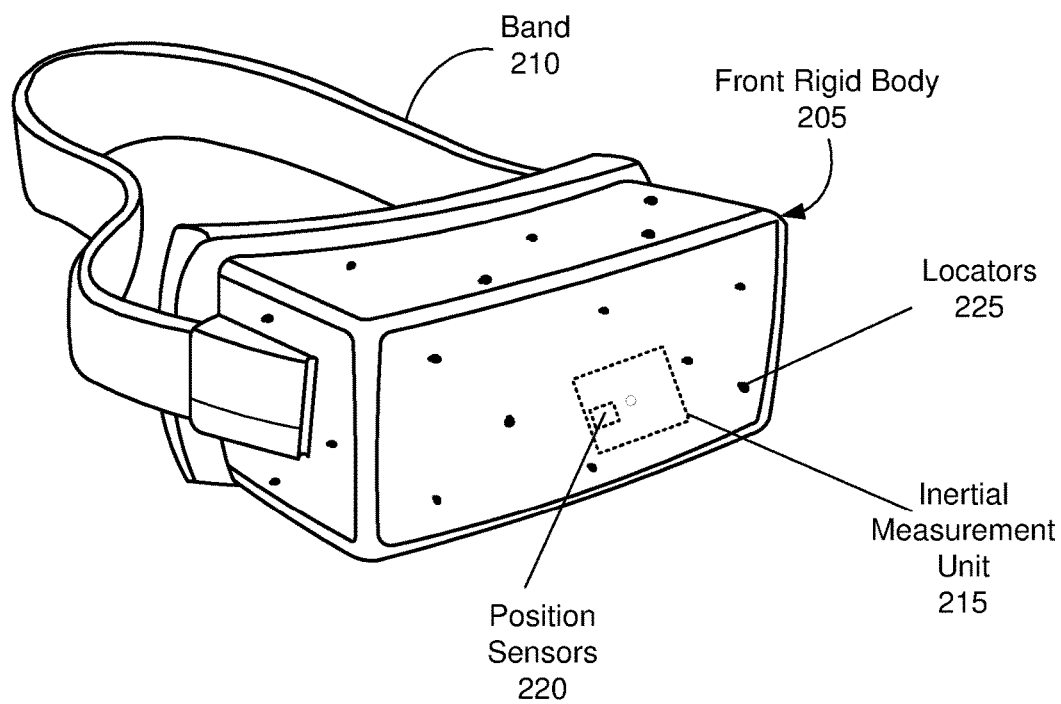
FIG. 2A is a wire diagram of a head-mounted display, in accordance with an embodiment.

FIG. 2A is a wire diagram of a HMD 200, in accordance with an embodiment. The HMD 200 includes a front rigid body 205 and a band 210. The front rigid body 205 includes one or more electronic display elements of an electronic display (not shown), an IMU 215, the one or more position sensors 220, and the locators 225. In the embodiment shown by FIG. 2A, the position sensors 220 are located within the IMU 215, and neither the IMU 215 nor the position sensors 220 are visible to the user. The IMU 215, the position sensors 220, and the locators 225 are discussed in detail below with regard to FIG. 7. Note in embodiments, where the HMD 200 acts as an AR or MR device portions of the HMD 200 and its internal components are at least partially transparent.

Figure 2B:
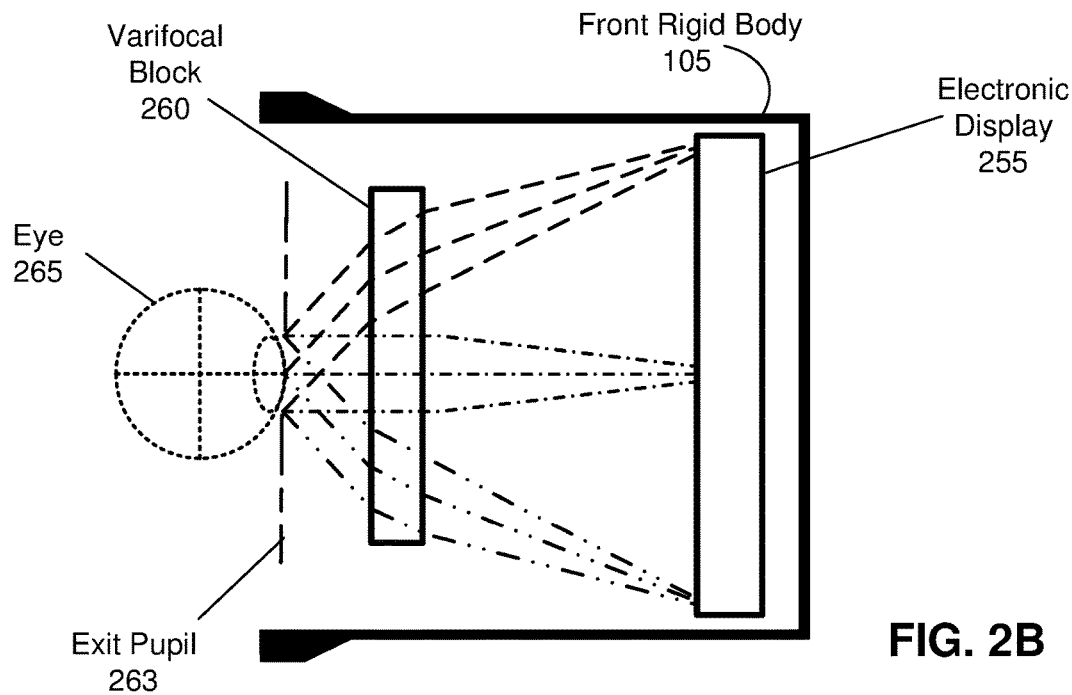
FIG. 2B is a cross section of a front rigid body of the head-mounted display in FIG. 2A, in accordance with an embodiment.

FIG. 2B is a cross section 250 of the front rigid body 205 of the embodiment of the HMD 200 shown in FIG. 2A. As shown in FIG. 2B, the front rigid body 205 includes an electronic display 255 and a varifocal block 260 that together provide image light to an exit pupil 263. The exit pupil 263 is the location of the front rigid body 205 where a user's eye 265 is positioned. For purposes of illustration, FIG. 2B shows a cross section 250 associated with a single eye 265, but another varifocal block 260, separate from the varifocal block 260, provides altered image light to another eye of the user. Additionally, the HMD 200 includes an eye tracking system (not shown). The eye tracking system may include, e.g., one or more sources that illuminate one or both eyes of the user, and one or more cameras that captures images of one or both eyes of the user.

The electronic display 255 displays images to the user. In various embodiments, the electronic display 255 may comprise a single electronic display or multiple electronic displays (e.g., a display for each eye of a user). Examples of the electronic display 255 include: a liquid crystal display (LCD), an organic light emitting diode (OLED) display, an active-matrix organic light-emitting diode display (AMOLED), a QOLED, a QLED, some other display, or some combination thereof.

The varifocal block 260 adjusts an orientation from light emitted from the electronic display 255 such that it appears at particular focal distances from the user. The varifocal block 260 includes one or more varifocal structures in optical series. A varifocal structure is an optical device that is configured to dynamically adjust its focus in accordance with instructions from a varifocal system. A varifocal structure includes at least a PBP liquid crystal lens (passive or active) and a liquid lens structure. The varifocal structure may also include one or more substrate layers, a switchable half waveplate (SHWP), a circular polarizer, or some combination thereof. Details of PBP liquid crystal lenses are discussed in detail below with regard to FIGS. 3A-3C. And different embodiments, of varifocal structures are discussed in detail below with regard to FIGS. 4-6.

A SHWP is a half waveplate that transmits a particular handedness of polarized light in accordance with a switching state (i.e., active or non-active). A varifocal block may use the SHWP to control the handedness of polarization of light in accordance with a switching state. The switching state of a SHWP is either active or non-active. When active, the SHWP reverses the handedness of polarized light, and when non-active, the SHWP transmits polarized light without affecting the handedness. Recall that a PBP lens acts in an additive state if it receives right handed circularly polarized light, and conversely, acts in a subtractive state if it receives left handed circularly polarized light. Accordingly, a SHWP placed before a PBP liquid crystal lens in optical series is able to control whether the PBP liquid crystal lens acts in an additive or subtractive state by controlling the handedness of polarization of the light incident on the PBP liquid crystal lens.

A circular polarizer polarized light converts incident light to circular polarized light of a particular handedness (i.e., right or left). The circular polarizer is transmissive such that it outputs circularly polarized light. Note, a circular polarizer is a passive element, and is smaller and less complex than, e.g., a SHWP.

The substrate layers are layers which other elements (e.g., SHWP, tunable liquid lens, liquid crystal, etc.) may be formed upon, coupled to, etc. The substrate layers are substantially transparent in the visible band (~380 nm to 750 nm). And in some embodiments, may also be transparent in some or all of the infrared (IR) band (~750 nm to 1 mm). The substrate layers may be composed of, e.g., $SiO_2$, plastic, sapphire, etc. These layers are discussed in more detail with regard to FIGS. 4-6.

The liquid lens structure is an optical element that is able to adjust focus over a continuous range of 0 to F (e.g., 0 to 2 Diopters), where F is an upper focal limit. The liquid lens structure includes a liquid layer that is encapsulated between a transparent deformable membrane layer and a transparent rigid layer. A varifocal system is able to dynamically control a location of a focal distance of the liquid lens structure. In some embodiments, the substrate layer is flat, however, it may also be curved. For example, the substrate may be a convex substrate or a concave substrate, both of which may adjust optical power (increase or decrease), but at the expense of increasing total thickness. The liquid layer includes one or more liquids which are substantially transparent the optical band of interest (e.g., visible, IR<etc.). There are two types of fluid-filled liquid membrane lens: constant fluid volume and variable fluid volume. The electro-wetting liquid lens is generally not applicable for HMDs because of the high power consumption and limited clear aperture size. A constant fluid volume liquid membrane lens is preferred in the HMD system, because of the compact design requirements. A constant fluid volume liquid membrane lens has a fixed volume of fluid which is encapsulated between a transparent deformable membrane layer and a rigid transparent substrate. To tune the focus, one portion of the membranes moves downward, other portion of the membranes moves upwards and form a lens of variable powers.

Additionally, in some embodiments, the varifocal block 260 magnifies received light, corrects optical errors associated with the image light, and presents the corrected image light is presented to a user of the HMD 200. The varifocal block 260 may additionally include one or more optical elements in optical series. An optical element may be an aperture, a Fresnel lens, a convex lens, a concave lens, a filter, or any other suitable optical element that affects the blurred image light. Moreover, the varifocal block 260 may include combinations of different optical elements. In some embodiments, one or more of the optical elements in the varifocal block 260 may have one or more coatings, such as anti-reflective coatings.

FIG. 3A is an example PBP liquid crystal lens 300, according to an embodiment. The PBP liquid crystal lens 300 creates a respective lens profile via an in-plane orientation (θ, azimuth angle) of a liquid crystal molecule, in which the phase difference T=2θ. In contrast, a conventional liquid crystal lens creates a lens profile via a birefringence (Δn) and layer thickness (d) of liquid crystals, and a number (#) of Fresnel zones (if it is Fresnel lens design), in which the phase difference T=Δnd*#*2π/λ. Accordingly, in some embodiments, a PBP liquid crystal lens 300 may have a large aperture size and can be made with a very thin liquid crystal layer, which allows fast switching speed to turn the lens power on/off.

Design specifications for HMDs used for VR, AR, or MR applications typically requires a large range of optical power to adapt for human eye vergence-accommodation (e.g., ~±2 Diopters or more), fast switching speeds (e.g., ~300 ms), and a good quality image. Note conventional liquid crystal lenses are not well suited to these applications as, a conventional liquid crystal lens generally would require the liquid crystal to have a relatively high index of refraction or be relatively thick (which reduces switching speeds). In contrast, a PBP liquid crystal lens is able to meet design specs using a liquid crystal having a relatively low index of refraction, is thin (e.g., a single liquid crystal layer can be ~2 µm), and has high switching speeds (e.g., 300 ms).

FIG. 3B is an example of liquid crystal orientations 310 in the PBP liquid crystal lens 300 of FIG. 3A, according to an embodiment. In the PBP liquid crystal lens 300, an azimuth angle (θ) of a liquid crystal molecule is continuously changed from a center 320 of the liquid crystal lens 300 to an edge 330 of the PBP liquid crystal lens 300, with a varied pitch Λ. Pitch is defined in a way that the azimuth angle of LC is rotated 180° from the initial state.

FIG. 3C is a section of liquid crystal orientations 340 taken along a y axis in the PBP liquid crystal lens 300 of FIG. 3A, according to an embodiment. It is apparent from the liquid crystal orientation 340 that a rate of pitch variation is a function of distance from the lens center 320. The rate of pitch variation increases with distance from the lens center. For example, pitch at the lens center ($Λ_0$), is the slowest and pitch at the edge 320 ($Λ_r$) is the highest, i.e., $Λ_0 > Λ_1 > \ldots > Λ_r$. In the x-y plane, to make a PBP liquid crystal lens with lens radius (r) and lens power (+/−f), the azimuth angle needs to meet: $2θ=r^2/f*(π/λ)$, where λ is the wavelength of light. Along with the z-axis, a dual twist or multiple twisted structure layers offers achromatic performance on efficiency in the PBP liquid crystal lens 300. Along with the z-axis, the non-twisted structure is simpler to fabricate then a twisted structure, but is optimized for a monochromatic light.

Note that a PBP liquid crystal lens may have a twisted or non-twisted structure. In some embodiments, a stacked PBP liquid crystal lens structure may include one or more PBP liquid crystal lenses having a twisted structure, one or more PBP liquid crystal lenses having a non-twisted structure, or some combination thereof.

Example Varifocal Structures

Below various designs of varifocal structures are discussed. It is important to note that these designs are merely illustrative, and other designs of varifocal structures may be generated using the principles described herein. In some embodiments, the varifocal structures within the varifocal block 260 are designed to meet requirements for an HMD (e.g., the HMD 200). Design requirements may include, for example, large aperture size (e.g., ≥4 cm) for large field of view (e.g., FOV, ~90 degrees with 20 mm eye relief distance), large optical power (e.g., ±2.0 Diopters) for adapting human eye vergence—accommodation, and fast switching speed (~300 ms) is for adapting human eye vergence—accommodation, and good image quality for meeting human eye acuity. In other embodiments the varifocal structures can include other optical elements in optical series.

Figure 4:
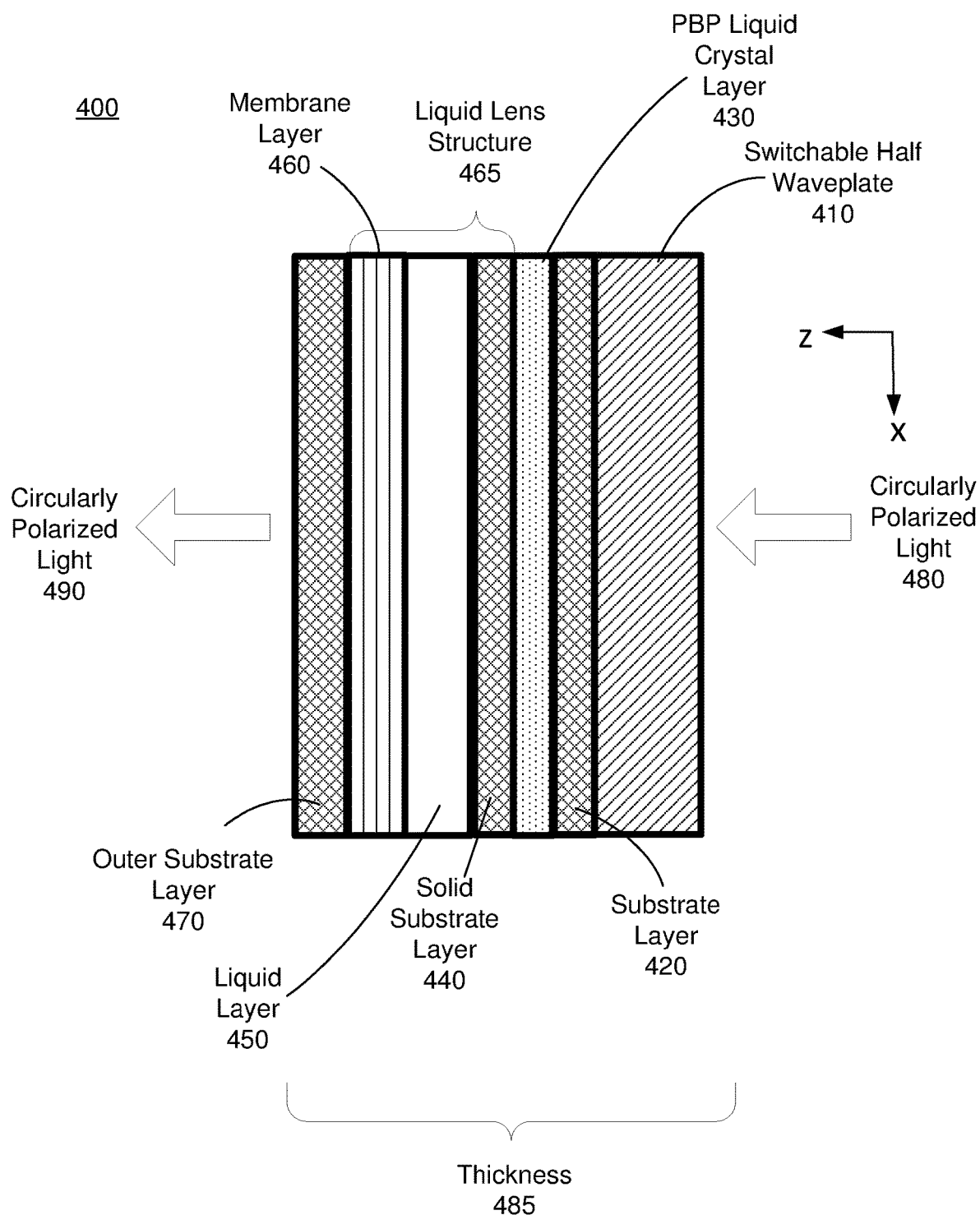
FIG. 4 is a diagram of a varifocal structure including an active PBP liquid crystal lens, according to an embodiment

FIG. 4 is a diagram of a varifocal structure 400 including an active PBP liquid crystal lens, according to an embodiment. The varifocal structure 400 has a continuous focal range of −f to (F+f), or in terms of diopters, −d to (D+d), where D is the maximum lens power of the liquid membrane lens module, and d is a fixed lens power of the PBP LC lens module, both D and d are positive integers. The varifocal structure 400 includes a SHWP 410, a substrate layer 420, a PBP liquid crystal layer 430, a solid substrate layer 440, a liquid layer 450, a membrane layer 460, and an outer substrate layer 470 in optical series for this embodiment.

The SHWP 410 is a half waveplate that reverses a handedness of polarized light in accordance with a switching state (i.e., active or non-active). In an active state the SHWP 410 reverses the handedness of incident circularly polarized light 480 (e.g., right to left, or vice versa). In a non-active state, the SHWP 410 transmits the circularly polarized light 480 without affecting its handedness.

The substrate layer 420 is a substance that serves as a foundation for adding additional layers to the varifocal structure 400. The substrate layer 420 may be e.g., silicon, silicon dioxide, sapphire, plastic, or some other semiconductor that is at least partially transmissive to light emitted by an electronic display. In this embodiment, the substrate layer 420 is coupled to the SHWP 410.

The PBP liquid crystal layer 430 is an active PBP liquid crystal lens. The PBP liquid crystal layer 430 has three optical states, an additive state, a subtractive state, and a neutral state. If not in the neutral state, and right handed circularly polarized light is incident on the PBP liquid crystal layer 430, the PBP liquid crystal layer 430 acts in an additive state such that a focus of the PBP liquid crystal layer 430 is f. In contrast, if not in the neutral state, and left handed circularly polarized light is incident on the PBP liquid crystal layer 430, the PBP liquid crystal layer 430 acts in a subtractive state such that a focus of the PBP liquid crystal layer 430 is −f. If in a neutral state (i.e., an applied voltage is over a threshold value), the PBP liquid crystal layer 430 does not affect the net optical power of the varifocal structure 400. Accordingly, the PBP liquid crystal layer 430 is able to adjust focus by either −f, 0, or f—or in terms of diopter −d, 0, d. In this embodiment, the PBP liquid crystal layer 430 is coupled to the substrate layer 420.

The solid substrate layer 440 is a substance that serves as a foundation for the liquid layer 450. The solid substrate layer 440 may be e.g., silicon, silicon dioxide, sapphire, plastic, or some other semiconductor that is at least partially transmissive to light emitted by an electronic display (e.g., electronic display 255). In this embodiment, the middle substrate layer 420 is coupled to the PBP liquid crystal layer 430.

The liquid layer 450 includes one or more liquids. The one or more liquids may include, e.g., water, oil, etc. The liquid layer 450 is substantially transmissive (i.e., transparent) to light emitted by the electronic display.

The membrane layer 460 encloses the liquid layer 450 between itself and the substrate layer 420, and together form a liquid lens structure 465. A varifocal system controls voltage applied to the membrane layer 460 to dynamically control, over a continuous range, an amount of optical power associated with the liquid lens structure 465. Responsive to an applied voltage, a top portion of the membrane layer 460 moves downward and a bottom portion of the membrane layer 460 moves upwards which causes curvature in the membrane layer 460 and the enclosed liquid in the liquid layer 450 to cause a change in optical power. Accordingly, the liquid lens structure 465 can vary a position of the top and/or bottom portion of the membrane layer 460 to cause a variation in optical power (e.g., to adjust optical power by 0 to D). In this embodiment, the liquid layer 450 is coupled to the solid substrate layer 440. Note that color dispersion of the membrane layer 460—liquid layer 450 is opposite of color dispersion caused by the PBP liquid crystal layer 430, which helps to mitigate color dispersion in the circularly polarized light 490. In this embodiment, the membrane layer 460 is coupled to the liquid layer 450.

The outer substrate layer 470 is formed on the membrane layer 460 and protects the membrane layer 460 from environmental factors (e.g., oxygen, water, etc.). The outer substrate layer 470 is transparent to the light emitted from the electronic display, and may be formed from, e.g., transparent glass, sapphire, plastic, some other material that is transparent to the light emitted by electronic display, or some combination thereof.

The varifocal structure 400 is relatively thin (e.g., a thickness 485 of ~2.2 mm) making it useful for applications with a HMD or more generally devices where a small form factor and weight are considerations. The varifocal structure 400 provides a continuous range of adjustment of optical power from −D to 2D (when D=d); a continuous range of adjustment of optical power from −d to −d+D, and from d to d+D (when d≠D). For example, assuming the circularly polarized light 480 is right handed circularly polarized light, this range of adjustment may be achieved using, e.g., the settings shown in Table 1 below.

TABLE 1

Settings for Optical Power Range

| Configuration # | SHWP State | PBP LC LENS Optical Power | Liquid Lens Optical Power | Optical Power Range of the Varifocal structure |
|---|---|---|---|---|
| 1 | Non-Active | d (additive) | From 0 to D | d to d +D |
| 2 | Active | −d (subtractive) | From 0 to D | −d to −d + D |
| 3 | Non-active or Active | 0 (Neutral) | From 0 to D | 0 to D |

For example, a liquid membrane lens offers a continuous tunable range from 0 to 1.5 diopter power before getting in the gravity deformation degradation in a vertically aligned configuration. An active PBP LC lens with an SHWP (switchable half waveplate), which provides three discrete states, (e.g. −1.5, 0, 1.5 diopter). Then, the continuously tunable range of the variable focal structure (400) is from −1.5 Diopter to 3 Diopter. With a passive PBP LC lens attached with an SWHP, which provides two discrete states, (e.g., −1.5 diopter, 1.5 diopter), the continuously tunable range of the lens stack is from −1.5 Diopter to 0, and 1.5 Diopter to 3 Diopter. Using a passive PBP LC lens offers a relatively simpler fabrication cost than the active PBP LC lens, and a thinner stack thickness. In a case, which the PBL LC lens has an optical power larger than the liquid membrane lens, (e.g. −3, 0, 3 diopters for an active PBP LC lens; −3, 3 diopters from a passive PBP LC lens), the continuously tunable range of the varifocal structure is from either −3 Diopter to −1.5 Diopter, 0 Diopter to 1.5 Diopter, and 3 Diopter to 4.5 Diopter for an active PBP LC lens or −3 Diopter to −1.5 Diopter and 3 Diopter to 4.5 Diopter for a passive PBP LC lens.

Note that this embodiment is based on circularly polarized light 480 being right handed circularly polarized light. In alternate embodiments, the circularly polarized light 480 may be left handed circularly polarized light. In this case, the varifocal structure 400 operates in substantially the same way, except the times when the SHWP 410 is active or non-active would be reversed. In alternate embodiments (not shown), The PBP liquid crystal layer 430 is a passive PBP liquid crystal lens, and the varifocal structure 400 would not include the substrate layer 420.

Figure 5:
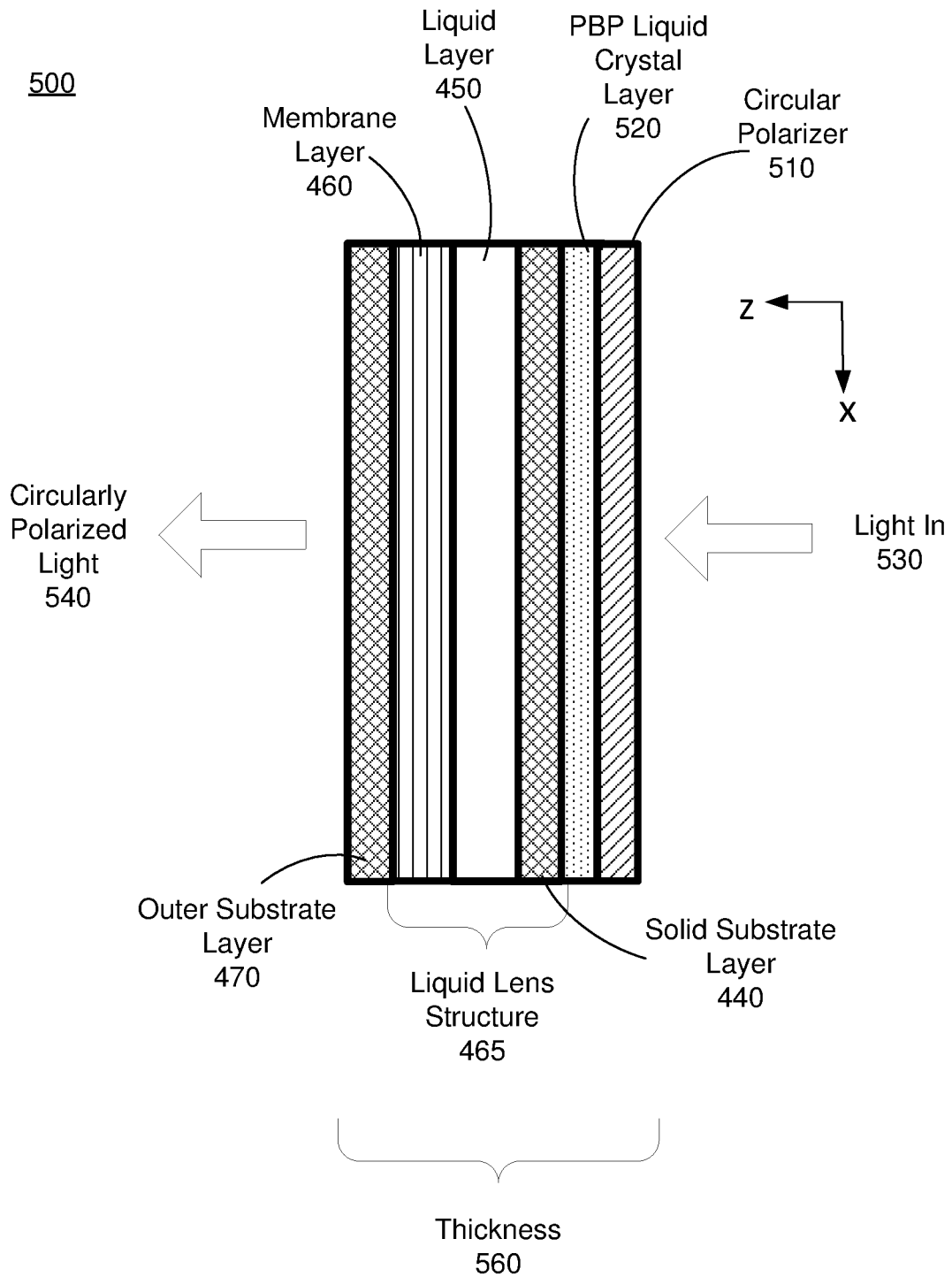
FIG. 5 is a diagram of a varifocal structure including a passive PBP liquid crystal lens, according to an embodiment.

FIG. 5 is a diagram of a varifocal structure 500 including a passive PBP liquid crystal lens, according to an embodiment. The varifocal structure 500 includes a circular polarizer 510, a PBP liquid crystal layer 520, a solid substrate layer 440, a liquid layer 450, a membrane layer 460, and an outer substrate layer 470 in optical series for this embodiment.

The circular polarizer 510 converts incident light (light in 530) to circular polarized light of a particular handedness (i.e., right or left). Note, a circular polarizer is a passive element, and is smaller and less complex than, e.g., the SHWP 410. Additionally, the circular polarizer 510 is fixed in terms of what handedness of polarization it outputs. Accordingly, in some embodiments, the circular polarizer 510 converts light in 530 to right handed circularly polarized light, and in alternate embodiments, the circular polarizer 510 converts the light in 530 to left handed circularly polarized light.

The PBP liquid crystal layer 520 is a passive PBP liquid crystal lens. The PBP liquid crystal layer 520 has two optical states: an additive state and a subtractive state. For a PBP liquid crystal layer 520 which acts in an additive state (focus at f, add d to the optical power) for right handed circularly polarized incident light, the PBP liquid crystal layer 520 acts in a subtractive state in contrast for left handed circularly polarized incident light (focus at −f, subtracts d from the optical power). Accordingly, depending on the handedness of polarization of incident light—which depends on the handedness of the circular polarizing filter 510, the PBP liquid crystal layer 520 is able to adjust focus by either −f or f—or in terms of diopter −d or d. In this embodiment, the PBP liquid crystal layer 520 is coupled to the circular polarizer 510. The solid substrate layer 440, the liquid layer 450, the membrane layer 460, and the outer substrate layer 470, operate substantially the same as described above with reference to FIG. 4.

In some embodiments, the varifocal structure 500 provides a continuous range of adjustment of optical power from −d to (D−d) if the circular polarizer 510 outputs left handed circularly polarized light. Left handed circularly polarized light causes the PBP crystal layer 520 to remove 'd' diopters of optical power. The liquid lens structure 465 is able to add back anywhere from 0 to D optical power—meaning the net tunable range of the varifocal structure 500 is −d to (D−d). In embodiments, where D equals d, this would provide a −d to 0 continuous range of tunability of optical power.

In alternate embodiments, the varifocal structure 500 provides a continuous range of adjustment of optical power from d to (d+D) if the circular polarizer 510 outputs right handed circularly polarized light. Right handed circularly polarized light causes the PBP crystal layer 520 to add 'd' diopters of optical power. The liquid lens structure 465 is able to add an additional anywhere from 0 to D optical power—meaning that in this embodiment, the net tunable range of the varifocal structure 500 is d to (d+D). Note, in some embodiments, the liquid lens structure 465 may be configured to instead adjust optical power from −D to 0. In this case, the net tunable range of the varifocal structure 500 is (d−D) to d. In embodiments, where D equals d, this would provide a 0 to d continuous range of tunability of optical power. Note—in some embodiments, the PBP liquid crystal layer 520 is an active PBP liquid crystal lens, and by placing the PBP liquid crystal layer 520 in a neutral state would provide tenability from 0 to D.

Note that use of passive elements (i.e., the circular polarizer 510 and the PBP liquid crystal layer 520) result in the varifocal structure being substantially thinner than the varifocal structure 400. For example, a thickness 560 of the varifocal structure 500 may be approximately 1.7 mm.

Figure 6:
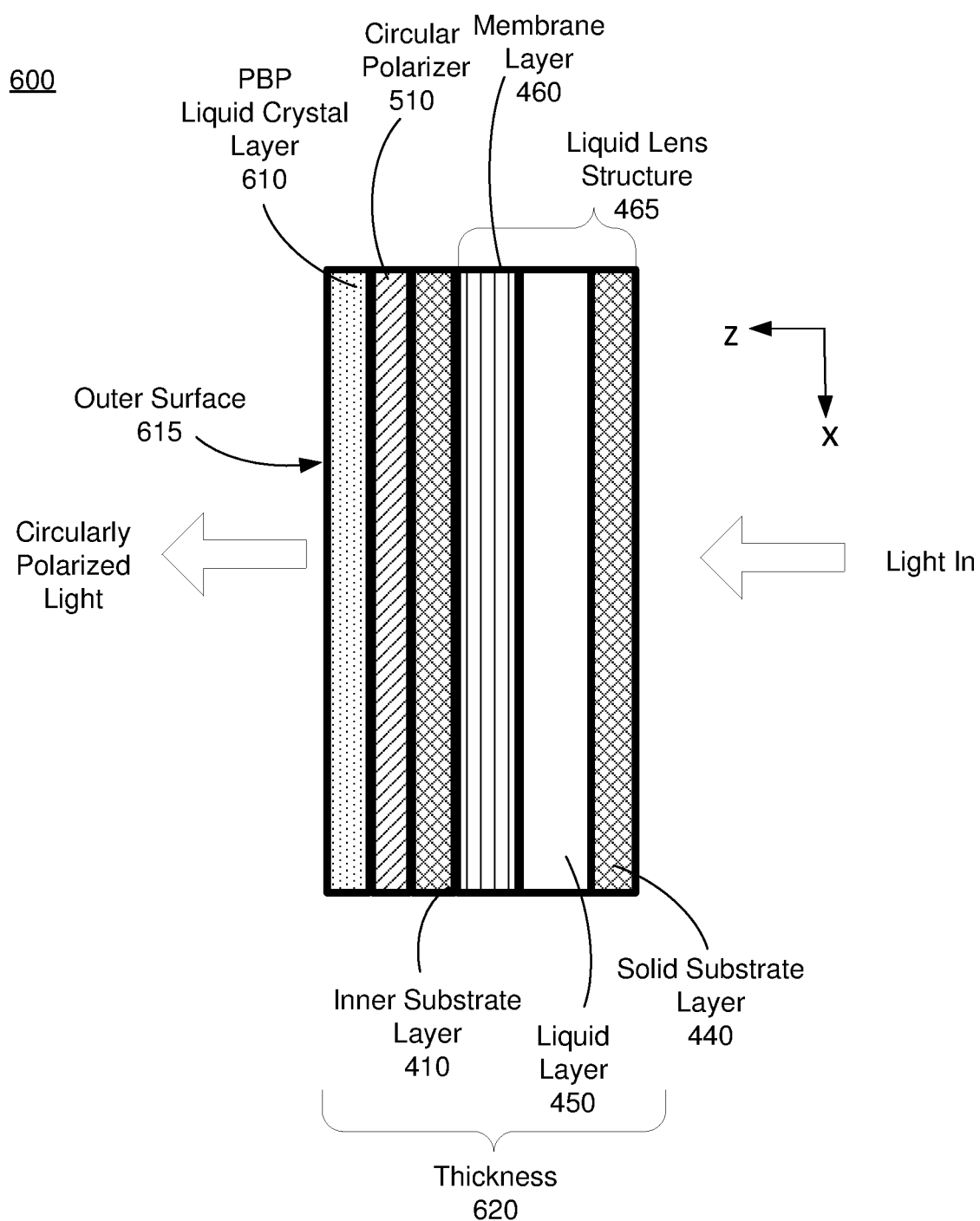
FIG. 6 is a diagram of another example of a varifocal structure including a passive PBP liquid crystal lens, according to an embodiment

FIG. 6 is a diagram of another example of a varifocal structure 600 including a passive PBP liquid crystal lens, according to an embodiment. The varifocal structure 600 includes a solid substrate layer 440, a liquid layer 450, a membrane layer 460, a substrate layer 410, a circular polarizer 510, and a PBP liquid crystal layer 610 in optical series for this embodiment.

The solid substrate layer 440, the liquid layer 450, the membrane layer 460, the substrate layer 410, the circular polarizer 510, operate substantially the same as described above with reference to FIG. 4. The PBP liquid crystal layer 610 is substantially the same as the PBP liquid crystal layer 520 (e.g., is as a passive PBP liquid crystal lens), except that it also includes an outer surface 615 that acts in a manner similar to the outer substrate layer 470. The outer surface 615 is transparent to the light emitted from the electronic display, and may be formed from, e.g., transparent glass, sapphire, plastic, some other material that is transparent to the light emitted by electronic display, or some combination thereof.

The varifocal structure 600 provides a same range of adjustment of optical power as the varifocal structure 500. For example, in some embodiments, the varifocal structure 600 provides a continuous range of adjustment of optical power from −d to (D−d) if the circular polarizer 510 outputs left handed circularly polarized light. In alternate embodiments, the varifocal structure 600 provides a continuous range of adjustment of optical power from d to (d+D) if the circular polarizer 510 outputs right handed circularly polarized light.

Note that use of passive elements (i.e., the circular polarizer 510 and the PBP liquid crystal layer 520) result in the varifocal structure being substantially thinner than the varifocal structure 400. For example, a thickness 620 of the varifocal structure 600 may be approximately 1.7 mm.

System Overview

Figure 7:
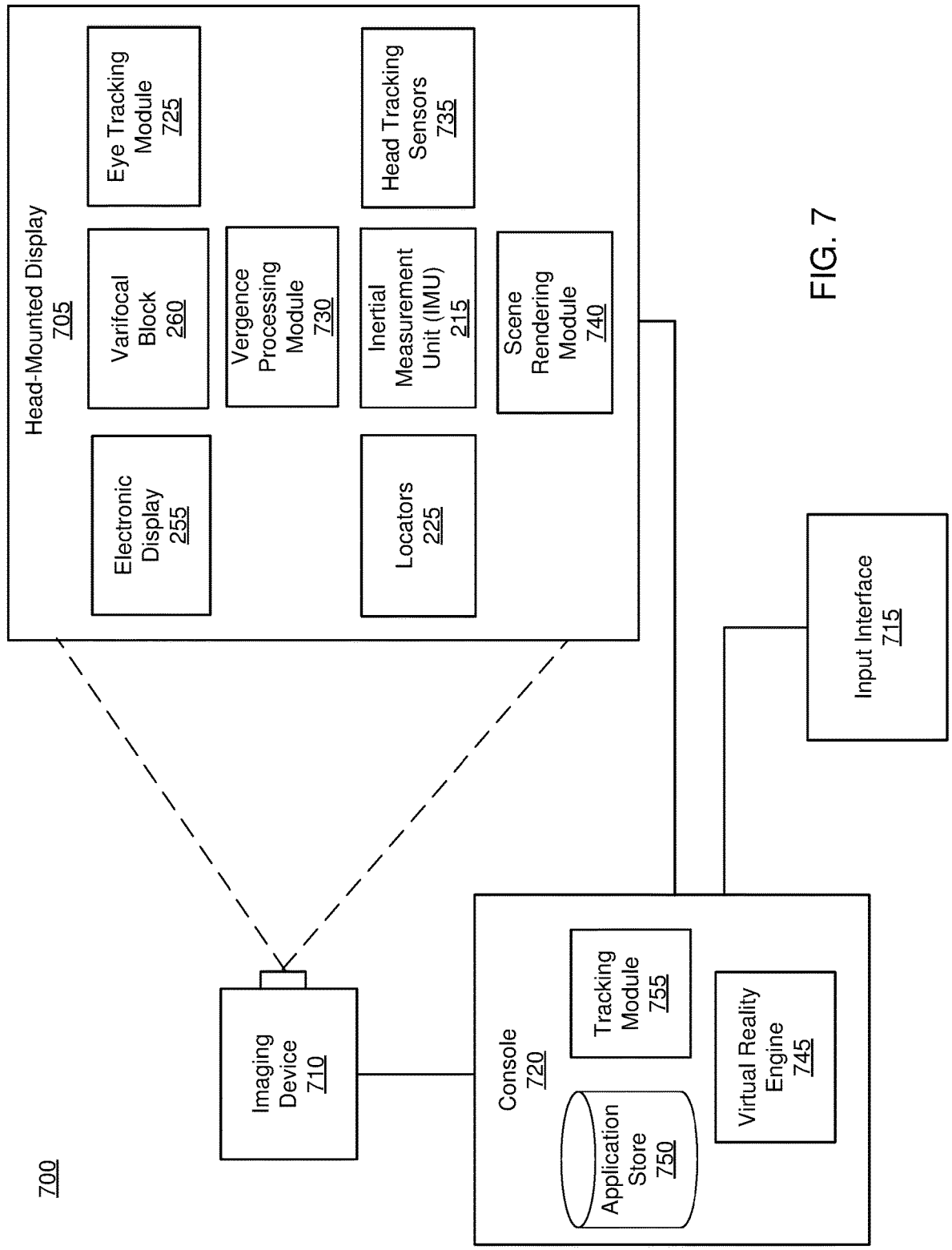
FIG. 7 is varifocal system in which a HMD operates, according to an embodiment.

FIG. 7 is varifocal system 700 in which a HMD 705 operates. The varifocal system 700 may be for use as a virtual reality (VR) system, an augmented reality (AR) system, a mixed reality (MR) system, or some combination thereof. In this example, the varifocal system 700 includes a HMD 705, an imaging device 710, and an input interface 715, which are each coupled to a console 720. While FIG. 7 shows a single HMD 705, a single imaging device 710, and a single input interface 715, in other embodiments, any number of these components may be included in the system. For example, there may be multiple HMDs 400 each having an associated input interface 715 and being monitored by one or more imaging devices 460, with each HMD 705, input interface 715, and imaging devices 460 communicating with the console 720. In alternative configurations, different and/or additional components may also be included in the varifocal system 700. The HMD 705 may act as a VR, AR, and/or a MR HMD. An MR and/or AR HMD augments views of a physical, real-world environment with computer-generated elements (e.g., images, video, sound, etc.).

The HMD 705 presents content to a user. In some embodiments, the HMD 705 is an embodiment of the HMD 200 described above with reference to FIGS. 2A and 2B. Example content includes images, video, audio, or some combination thereof. Audio content may be presented via a separate device (e.g., speakers and/or headphones) external to the HMD 705 that receives audio information from the HMD 705, the console 720, or both. The HMD 705 includes an electronic display 255 (described above with reference to FIG. 2B), a varifocal block 260 (described above with reference to FIG. 2B), an eye tracking module 725, a vergence processing module 730, one or more locators 225, an internal measurement unit (IMU) 215, head tracking sensors 735, and a scene rendering module 740.

The varifocal block 260 adjusts its focal length by adjusting a focal length of one or more varifocal structures. As noted above with reference to FIG. 2B-6B, the varifocal block 260 adjusts its focal length by activating and/or deactivating a SHWP, controlling a state of a PBP liquid crystal lens, adjusting a liquid lens structure, some combination thereof. The varifocal block 260 adjusts its focal length responsive to instructions from the console 720. Note that a varifocal tuning speed of a varifocal structure is limited by a tuning speed of the liquid lens structure, and accordingly, the liquid lens structure is electrically tuned.

The eye tracking module 725 tracks an eye position and eye movement of a user of the HMD 705. A camera or other optical sensor (that is part the eye tracking module 725) inside the HMD 705 captures image information of a user's eyes, and eye tracking module 725 uses the captured information to determine interpupillary distance, interocular distance, a three-dimensional (3D) position of each eye relative to the HMD 705 (e.g., for distortion adjustment purposes), including a magnitude of torsion and rotation (i.e., roll, pitch, and yaw) and gaze directions for each eye. In one example, infrared light is emitted within the HMD 705 and reflected from each eye. The reflected light is received or detected by the camera and analyzed to extract eye rotation from changes in the infrared light reflected by each eye. Many methods for tracking the eyes of a user can be used by eye tracking module 725. Accordingly, the eye tracking module 725 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, the eye tracking module 725 integrates information from past measurements, measurements identifying a position of a user's head, and 3D information describing a scene presented by the electronic display 255. Thus, information for the position and orientation of the user's eyes is used to determine the gaze point in a virtual scene presented by the HMD 705 where the user is looking.

The vergence processing module 730 determines a vergence depth of a user's gaze based on the gaze point or an estimated intersection of the gaze lines determined by the eye tracking module 725. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 730 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 225 are objects located in specific positions on the HMD 705 relative to one another and relative to a specific reference point on the HMD 705. A locator 225 may be a light emitting diode (LED), a corner cube reflector, a reflective marker, a type of light source that contrasts with an environment in which the HMD 705 operates, or some combination thereof. Active locators 225 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

The locators 225 can be located beneath an outer surface of the HMD 705, which is transparent to the wavelengths of light emitted or reflected by the locators 225 or is thin enough not to substantially attenuate the wavelengths of light emitted or reflected by the locators 225. Further, the outer surface or other portions of the HMD 705 can be opaque in the visible band of wavelengths of light. Thus, the locators 225 may emit light in the IR band while under an outer surface of the HMD 705 that is transparent in the IR band but opaque in the visible band.

The IMU 215 is an electronic device that generates fast calibration data based on measurement signals received from one or more of the head tracking sensors 735, which generate one or more measurement signals in response to motion of HMD 705. Examples of the head tracking sensors 735 include accelerometers, gyroscopes, magnetometers, other sensors suitable for detecting motion, correcting error associated with the IMU 215, or some combination thereof. The head tracking sensors 735 may be located external to the IMU 215, internal to the IMU 215, or some combination thereof.

Based on the measurement signals from the head tracking sensors 735, the IMU 215 generates fast calibration data indicating an estimated position of the HMD 705 relative to an initial position of the HMD 705. For example, the head tracking sensors 735 include multiple accelerometers to measure translational motion (forward/back, up/down, left/right) and multiple gyroscopes to measure rotational motion (e.g., pitch, yaw, and roll). The IMU 215 can, for example, rapidly sample the measurement signals and calculate the estimated position of the HMD 705 from the sampled data. For example, the IMU 215 integrates measurement signals received from the accelerometers over time to estimate a velocity vector and integrates the velocity vector over time to determine an estimated position of a reference point on the HMD 705. The reference point is a point that may be used to describe the position of the HMD 705. While the reference point may generally be defined as a point in space, in various embodiments, a reference point is defined as a point within the HMD 705 (e.g., a center of the IMU 630). Alternatively, the IMU 215 provides the sampled measurement signals to the console 720, which determines the fast calibration data.

The IMU 215 can additionally receive one or more calibration parameters from the console 720. As further discussed below, the one or more calibration parameters are used to maintain tracking of the HMD 705. Based on a received calibration parameter, the IMU 215 may adjust one or more of the IMU parameters (e.g., sample rate). In some embodiments, certain calibration parameters cause the IMU 215 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 740 receives content for the virtual scene from a VR engine 745 and provides the content for display on the electronic display 255. Additionally, the scene rendering module 740 can adjust the content based on information from the vergence processing module 730, the IMU 215, and the head tracking sensors 735. The scene rendering module 740 determines a portion of the content to be displayed on the electronic display 255 based on one or more of the tracking module 755, the head tracking sensors 735, or the IMU 215, as described further below.

The imaging device 710 generates slow calibration data in accordance with calibration parameters received from the console 720. Slow calibration data includes one or more images showing observed positions of the locators 225 that are detectable by imaging device 710. The imaging device 710 may include one or more cameras, one or more video cameras, other devices capable of capturing images including one or more locators 225, or some combination thereof. Additionally, the imaging device 710 may include one or more filters (e.g., for increasing signal to noise ratio). The imaging device 710 is configured to detect light emitted or reflected from the locators 225 in a field of view of the imaging device 710. In embodiments where the locators 225 include passive elements (e.g., a retroreflector), the imaging device 710 may include a light source that illuminates some or all of the locators 225, which retro-reflect the light towards the light source in the imaging device 710. Slow calibration data is communicated from the imaging device 710 to the console 720, and the imaging device 710 receives one or more calibration parameters from the console 720 to adjust one or more imaging parameters (e.g., focal length, focus, frame rate, ISO, sensor temperature, shutter speed, aperture, etc.).

The input interface 715 is a device that allows a user to send action requests to the console 720. An action request is a request to perform a particular action. For example, an action request may be to start or end an application or to perform a particular action within the application. The input interface 715 may include one or more input devices. Example input devices include a keyboard, a mouse, a game controller, or any other suitable device for receiving action requests and communicating the received action requests to the console 720. An action request received by the input interface 715 is communicated to the console 720, which performs an action corresponding to the action request. In some embodiments, the input interface 715 may provide haptic feedback to the user in accordance with instructions received from the console 720. For example, haptic feedback is provided by the input interface 715 when an action request is received, or the console 720 communicates instructions to the input interface 715 causing the input interface 715 to generate haptic feedback when the console 720 performs an action.

The console 720 provides content to the HMD 705 for presentation to the user in accordance with information received from the imaging device 710, the HMD 705, or the input interface 715. In the example shown in FIG. 4, the console 720 includes an application store 750, a tracking module 755, and the VR engine 745. Some embodiments of the console 720 have different or additional modules than those described in conjunction with FIG. 4. Similarly, the functions further described below may be distributed among components of the console 720 in a different manner than is described here.

The application store 750 stores one or more applications for execution by the console 720. An application is a group of instructions, that when executed by a processor, generates content for presentation to the user. Content generated by an application may be in response to inputs received from the user via movement of the HMD 705 or the input interface 715. Examples of applications include gaming applications, conferencing applications, video playback application, or other suitable applications.

The tracking module 755 calibrates the varifocal system 700 using one or more calibration parameters and may adjust one or more calibration parameters to reduce error in determining position of the HMD 705. For example, the tracking module 755 adjusts the focus of the imaging device 710 to obtain a more accurate position for observed locators 225 on the HMD 705. Moreover, calibration performed by the tracking module 755 also accounts for information received from the IMU 215. Additionally, if tracking of the HMD 705 is lost (e.g., imaging device 710 loses line of sight of at least a threshold number of locators 225), the tracking module 755 re-calibrates some or all of the varifocal system 700 components.

Additionally, the tracking module 755 tracks the movement of the HMD 705 using slow calibration information from the imaging device 710 and determines positions of a reference point on the HMD 705 using observed locators from the slow calibration information and a model of the HMD 705. The tracking module 755 also determines positions of the reference point on the HMD 705 using position information from the fast calibration information from the IMU 215 on the HMD 705. Additionally, the tracking module 755 may use portions of the fast calibration information, the slow calibration information, or some combination thereof, to predict a future location of the HMD 705, which is provided to the VR engine 745.

The VR engine 745 executes applications within the varifocal system 700 and receives position information, acceleration information, velocity information, predicted future positions, or some combination thereof for the HMD 705 from the tracking module 755. Based on the received information, the VR engine 745 determines content to provide to the HMD 705 for presentation to the user, such as a virtual scene, one or more virtual objects to overlay onto a real world scene, etc.

In some embodiments, the VR engine 745 maintains focal capability information of the varifocal block 260. Focal capability information is information that describes what focal distances are available to the varifocal block 260. Focal capability information may include, e.g., a range of focus the varifocal block 260 is able to accommodate (e.g., 0 to 4 diopters); combinations of settings for SHWPs (e.g., active or non-active), active PBP liquid crystal lenses, and liquid tunable lenses that map to particular focal planes; combinations of settings for PBP liquid crystal lenses and liquid tunable lenses that map to particular focal planes; settings for liquid tunable lenses that map to particular focal planes; or some combination thereof.

The VR engine 745 generates instructions for the varifocal block 260, the instructions causing the varifocal block 260 to adjust its focal distance to a particular location. The VR engine 745 generates the instructions based on focal capability information and, e.g., information from the vergence processing module 730, the IMU 215, and the head tracking sensors 735. The VR engine 745 uses the information from the vergence processing module 730, the IMU 215, and the head tracking sensors 735, or some combination thereof, to select a focal plane to present content to the user. The VR engine 745 then uses the focal capability information to determine settings for one or SHWPs, one or more active PBP liquid crystal lenses, one or more liquid lens structures, or some combination thereof, within the varifocal block 260 that are associated with the selected focal plane. The VR engine 745 generates instructions based on the determined settings, and provides the instructions to the varifocal block 260.

Additionally, the VR engine 745 performs an action within an application executing on the console 720 in response to an action request received from the input interface 715 and provides feedback to the user that the action was performed. The provided feedback may be visual or audible feedback via the HMD 705 or haptic feedback via VR input interface 715.

Figure 8:
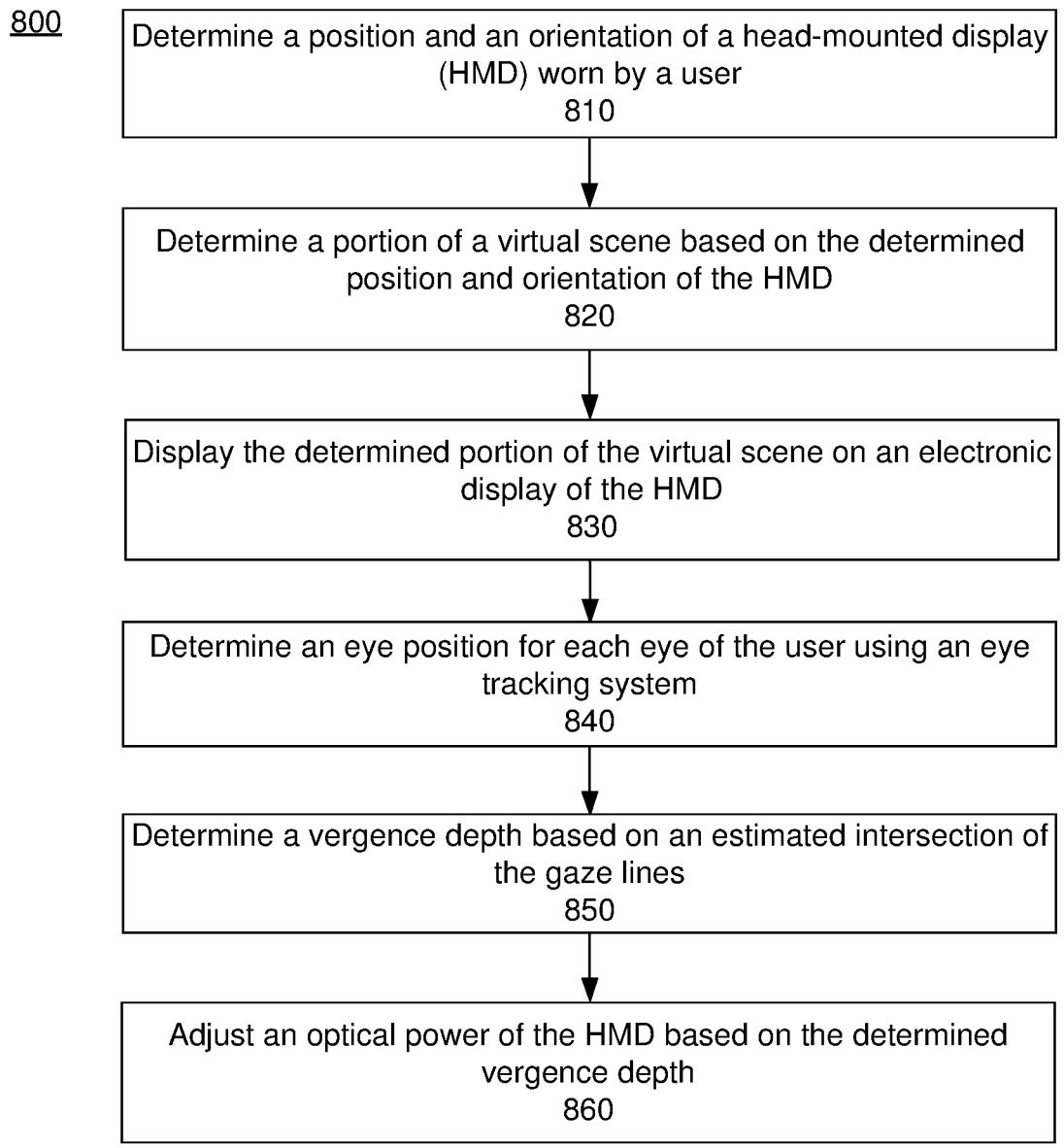
FIG. 8 is a process for mitigating vergence-accommodation conflict by adjusting the focal length of a HMD, according to an embodiment.

FIG. 8 is a process 800 for mitigating vergence-accommodation conflict by adjusting the focal length of an HMD 705, according to an embodiment. The process 800 may be performed by the varifocal system 700 in some embodiments. Alternatively, other components may perform some or all of the steps of the process 800. For example, in some embodiments, a HMD 705 and/or a console (e.g., console 720) may perform some of the steps of the process 800. Additionally, the process 800 may include different or additional steps than those described in conjunction with FIG. 8 in some embodiments or perform steps in different orders than the order described in conjunction with FIG. 8.

As discussed above, a multifocal system 800 may dynamically vary its focus to bring images presented to a user wearing the HMD 200 into focus, which keeps the user's eyes in a zone of comfort as vergence and accommodation change. Additionally, eye tracking in combination with the variable focus of the varifocal system 700 allows blurring to be introduced as depth cues in images presented by the HMD 200.

The varifocal system 700 determines 810 a position, an orientation, and/or a movement of HMD 705. The position is determined by a combination of the locators 225, the IMU 215, the head tracking sensors 735, the imagining device 710, and the tracking module 755, as described above in conjunction with FIG. 7.

The varifocal system 700 determines 820 a portion of a virtual scene based on the determined position and orientation of the HMD 705. The varifocal system 700 maps a virtual scene presented by the HMD 705 to various positions and orientations of the HMD 705. Thus, a portion of the virtual scene currently viewed by the user is determined based on the position, orientation, and movement of the HMD 705.

The varifocal system 700 displays 830 the determined portion of the virtual scene being on an electronic display (e.g., the electronic display 255) of the HMD 705. In some embodiments, the portion is displayed with a distortion correction to correct for optical error that may be caused by the image light passing through the varifocal block 260.

Further, the varifocal block 260 has activated/deactivated one or more SHWPS, PBP liquid crystal lenses, one or more liquid lens structures, or some combination thereof, to provide focus and accommodation to the location in the portion of the virtual scene where the user's eyes are verged.

The varifocal system 700 determines 840 an eye position for each eye of the user using an eye tracking system. The varifocal system 700 determines a location or an object within the determined portion at which the user is looking to adjust focus for that location or object accordingly. To determine the location or object within the determined portion of the virtual scene at which the user is looking, the HMD 705 tracks the position and location of the user's eyes using image information from an eye tracking system (e.g., eye tracking module 725). For example, the HMD 705 tracks at least a subset of a 3D position, roll, pitch, and yaw of each eye and uses these quantities to estimate a 3D gaze point of each eye.

Figure 9:
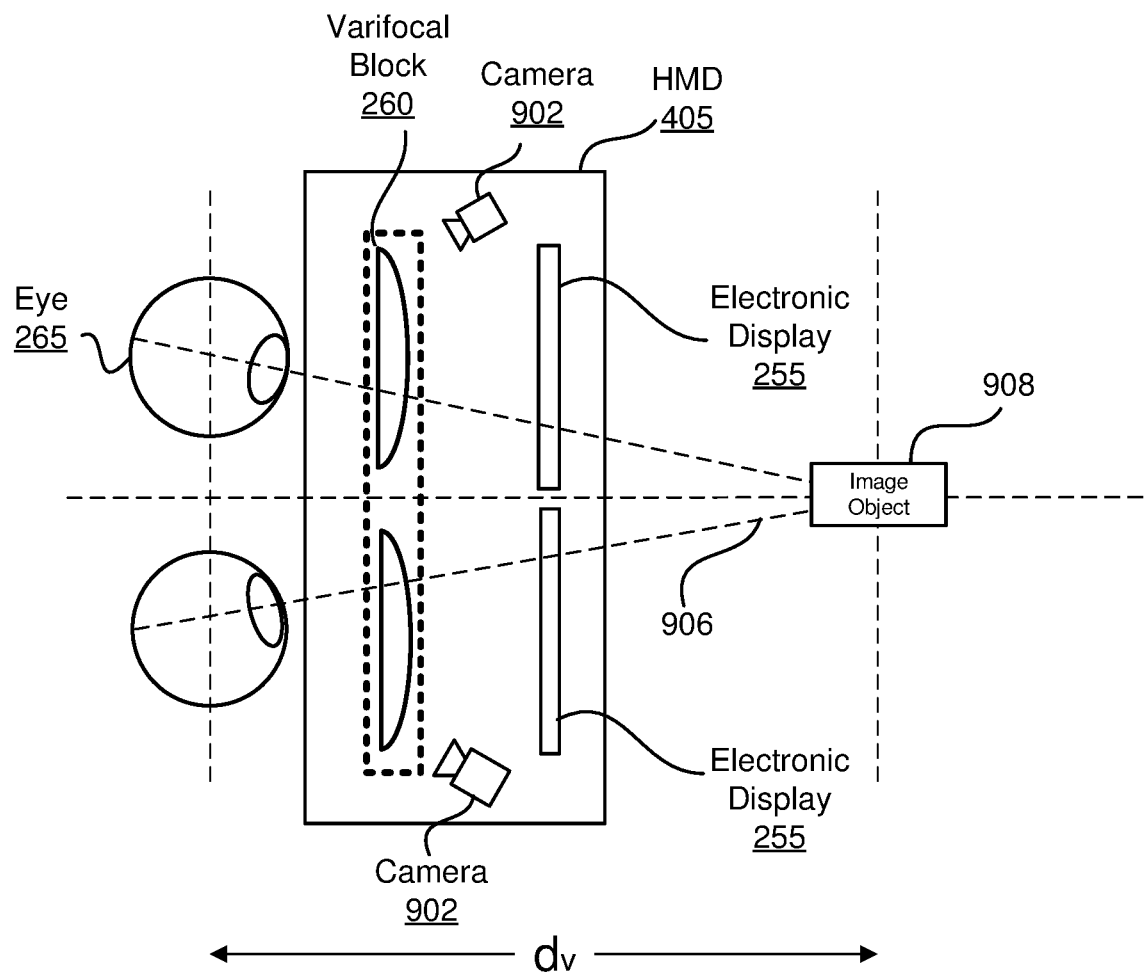
FIG. 9 shows an example process for mitigating vergence-accommodation conflict by adjusting a focal length of a varifocal block that includes varifocal structures, in accordance with an embodiment.

The varifocal system 700 determines 850 a vergence depth based on an estimated intersection of gaze lines. For example, FIG. 9 shows a cross section of an embodiment of the HMD 705 that includes camera 902 for tracking a position of each eye 265, the electronic display 255, and the varifocal block 260 that includes two varifocal structures, as described with respect to FIGS. 2B and 4-6. In this example, the camera 902 captures images of the user's eyes looking at an image object 908 and the eye tracking module 725 determines an output for each eye 265 and gaze lines 906 corresponding to the gaze point or location where the user is looking based on the captured images. Accordingly, vergence depth ($d_v$) of the image object 908 (also the user's gaze point) is determined 850 based on an estimated intersection of the gaze lines 906. As shown in FIG. 9, the gaze lines 906 converge or intersect at distance dam, where the image object 908 is located. In some embodiments, information from past eye positions, information describing a position of the user's head, and information describing a scene presented to the user may also be used to estimate the 3D gaze point of an eye in various embodiments.

Accordingly, referring again to FIG. 8, the varifocal system 700 adjusts 860 an optical power of the HMD 705 based on the determined vergence depth. The varifocal system 700 selects a focal plane that matches the vergence depth by controlling one or more SHWPs, one or more PBP liquid crystal lenses, one or more liquid crystal lenses, or some combination thereof. As described above, the optical power of the varifocal block 260 is adjusted to change a focal distance of the HMD 705 to provide accommodation for the determined vergence depth corresponding to where or what in the displayed portion of the virtual scene the user is looking.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
    selecting a state of a switchable half waveplate (SHWP) of a varifocal block;
    selecting an optical power of a liquid lens structure of the varifocal block from a range of optical power, the liquid lens structure in optical series with a liquid crystal (LC) lens and the SHWP; and
    adjusting the SHWP to the selected state and the liquid lens structure to the selected optical power,
    wherein a range of adjustment of optical power for the varifocal block is based in part on the state of the SHWP and the range of optical power of the liquid lens structure.

2. The method of claim 1, wherein the range of optical power of the liquid lens structure is a continuous range of optical power.

3. The method of claim 1, wherein the range of adjustment of optical power for the varifocal block is a continuous range of adjustment of optical power.

4. The method of claim 1, wherein the LC lens is positioned between the liquid lens structure and the SHWP.

5. The method of claim 4, wherein, based in part on a state of the SHWP and a state of the LC lens, the range of adjustment of optical power for the varifocal block is selected from the group consisting of:

d to (D+d), −d to (−d+D), and 0 to D, where:
- −d is the optical power of the LC lens in the subtractive state,
- D is a maximum optical power of the range of the liquid lens structure, and
- d is the optical power of the LC lens in the additive state.

6. The method of claim 1, wherein the LC lens is positioned between the liquid lens structure and a circular polarizer.

7. The method of claim 1, wherein a circular polarizer is positioned between the liquid lens structure and the LC lens.

8. The method of claim 1, wherein the LC lens is a Pancharatnam Berry Phase (PBP) liquid crystal lens.

9. The method of claim 1, wherein a color dispersion caused by the liquid lens structure is opposite of a color dispersion caused by the LC lens.

10. The method of claim 1, further comprising:
presenting content from an electronic display of a head-mounted display at an image plane associated with the optical power of the varifocal block.

11. The method of claim 1, wherein selecting the optical power of the liquid lens structure from the range of optical powers, comprises:
selecting a curvature for a deformable membrane of the liquid lens.

12. The method of claim 1, further comprising:
determining a gaze line for each of the user based on a tracked eye position for each eye;
determining a vergence depth based on an estimated intersection of the gaze lines; and
wherein the selected state of the SHWP and the selected optical power of the liquid lens structure are based in part on the vergence depth.

13. A head-mounted display (HMD) comprising:
a varifocal block that receives content from an electronic display, and presents the content over a plurality of image planes that are associated with different optical powers of the varifocal block, the varifocal block comprising:
 a liquid crystal (LC) lens,
 a liquid lens structure in optical series with the LC lens, the liquid lens structure having a range of optical power, and
 a switchable half waveplate (SHWP) that is in optical series with the liquid lens structure and the LC lens,
wherein the HMD is configured to:
 select a state of the SHWP,
 select an optical power of the liquid lens structure from the range of optical power; and
 adjust the SHWP to the selected state and the liquid lens structure to the selected optical power, and
wherein a range of adjustment of optical power for the varifocal block is based in part on the state of the SHWP and the range of optical power of the liquid lens structure.

14. The HMD of claim 13, wherein the range of optical power of the liquid lens structure is a continuous range of optical power.

15. The HMD of claim 13, wherein the range of adjustment of optical power for the varifocal block is a continuous range of adjustment of optical power.

16. The HMD of claim 13, further comprising one of:
a first circular polarizer, and the LC lens is positioned between the liquid lens structure and the first circular polarizer; and
a second circular polarizer that is positioned between the liquid lens structure and the LC lens.

17. The HMD of claim 13, wherein the LC lens is positioned between the liquid lens structure and the SHWP.

18. The HMD of claim 13, wherein the LC lens is a Pancharatnam Berry Phase (PBP) liquid crystal lens.

19. The HMD of claim 13, wherein a color dispersion caused by the liquid lens structure is opposite of a color dispersion caused by the LC lens.

20. A non-transitory computer readable medium configured to store program code instructions, when executed by a processor, cause the processor to perform steps comprising:
selecting a state of a switchable half waveplate (SHWP) of a varifocal block;
selecting an optical power of a liquid lens structure of the varifocal block from a range of optical power, the liquid lens structure in optical series with a liquid crystal (LC) lens and the SHWP; and
adjusting the SHWP to the selected state and the liquid lens structure to the selected optical power,
wherein a range of adjustment of optical power for the varifocal block is based in part on the state of the SHWP and the range of optical power of the liquid lens structure.

* * * * *